No. 754,317. PATENTED MAR. 8, 1904.
F. KALTENEGGER & N. L. VON LIBURNAU.
METHOD OF DISSOLVING GASES IN LIQUIDS FOR THE PURPOSE OF
KEEPING ALIVE AQUATIC ANIMALS AND WATER PLANTS.
APPLICATION FILED AUG. 14, 1903.
NO MODEL.
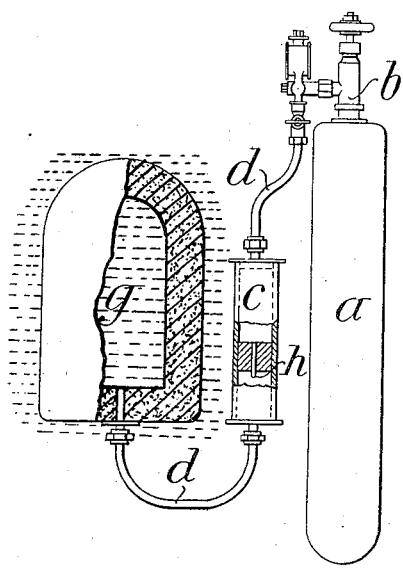
Witnesses.
John Brown.
Robert Everett.
Inventors.
Ferdinand Kaltenegger.
Norbert Lorenz von Liburnau.
By James L. Norris.
Atty.

No. 754,317. Patented March 8, 1904.

UNITED STATES PATENT OFFICE.

FERDINAND KALTENEGGER, OF BRIXEN, AND NORBERT LORENZ VON LIBURNAU, OF WEIDLINGAN, AUSTRIA-HUNGARY.

METHOD OF DISSOLVING GASES IN LIQUIDS FOR THE PURPOSE OF KEEPING ALIVE AQUATIC ANIMALS AND WATER-PLANTS.

SPECIFICATION forming part of Letters Patent No. 754,317, dated March 8, 1904.

Application filed August 14, 1903. Serial No. 169,511. (No specimens.)

*To all whom it may concern:*

Be it known that we, FERDINAND KALTENEGGER, residing at Brixen, Tyrol, and NORBERT LORENZ VON LIBURNAU, residing at Weidlingan, Lower Austria, Empire of Austria-Hungary, subjects of the Emperor of Austria-Hungary, have invented certain new and useful Improvements in Methods of Dissolving Gases in Liquids for the Purpose of Keeping Alive Aquatic Animals and Water-Plants, of which the following is a specification.

Living organisms—such as aquatic animals, or their eggs, (spawn,) water-plants, &c.—which are kept in vessels for transport in fish-incubators, aquaria, or similar receptacles containing water require under any circumstances dissolved gases—in particular, dissolved oxygen—for breathing and for remaining alive. These methods and arrangements by means of which it has been endeavored to incorporate gases in liquids by simply distributing the gases in a finely-divided condition within the liquid, and thereby reducing them into small bubbles, are not sufficient for the object aimed at, because the little bubbles pass through the liquid very quickly and then escape from the same. For this reason only a very small percentage of the gas will effectively be dissolved notwithstanding the relatively great consumption of gas.

The present invention relates to a method for obtaining as high as possible a percentage of the dissolved gas—that is to say, to dissolve as considerable a part as possible of the quantity of gas introduced into the liquid, while at the same time as small as possible a part of the quantity of gas is allowed to escape unused from the liquid in the shape of bubbles. Besides the improved method allows to obtain that with an economical consumption of gas the high percentage of dissolved gas is continuously maintained and that the admission of fresh gas is effected in the same measure as the gas contained in the solution is being consumed by the organisms.

According to the present invention the hereinbefore-stated requirement of a high and at the same time constant percentage of dissolved gas is obtained by means of a diaphragm, through which the gases required by the living organisms contained in a liquid for their respiration pass under pressure, whereupon they enter into the liquid. During this proceeding a supersaturated gaseous solution is produced in the interior space of the humid body of the diaphragm by the pressure the gas exercises on the latter, the said solution entering into osmotic interchange with the liquid surrounding the diaphragm, whereby the liquid is enriched in dissolved gas by the diffusion of the gaseous solution into the surrounding liquid. The non-dissolved remainder of the gas, the amount of which varies within wide limits, depending upon the nature of the gas employed, escapes from the diaphragm in the shape of very small bubbles, which while rising slowly in the liquid dissolve either entirely or partly, according to the size of the surface, the duration of their rising, and the velocity of the bubbles.

In order to carry out the hereinbefore-characterized method with an economical consumption of gas and in a manner well adapted and advantageous for the purpose viewed, an arrangement is employed, which is shown diagrammatically in the accompanying drawing. The said arrangement consists of a source of gas $a$ of any kind—for example, a bottle filled with oxygen—and communicating with a reduction-valve $b$ of well-known construction, which is connected to a conduit $d$, leading to a body $g$—for example, a hollow porous-stone block—constituting the diaphragm and arranged in the receptacle within the liquid containing the living organisms. The diaphragm is preferably formed in the shape of a cylinder or a sphere, and its maximum horizontal cross-sectional area is one-tenth of the bottom surface of the receptacle. With receptacles for transport, &c., the whole arrangement may be placed on the bottom of the space filled with liquid and containing the living organisms. If it is desired that the gas coming from a source of gas of a variable pressure, such as a bottle or other receptacle filled with compressed gas, and conveyed into the diaphragm by means of a reduction-valve invariably adjusted should be fed to the diaphragm in such a manner that in the unit of time equal quantities of gas may pass independently from the differences of pressure prevailing on both sides of the reduction-valve, a stowing arrangement $c$ is inserted into the conduit leading from the valve to the diaphragm. The said arrangement consists, essentially, of a cylinder or other receptacle possessing an outlet of very small cross-section compared with the cross-sectional area in question of the inlet. This result may be obtained, for example, by dividing the interior hollow of the cylinder by a partition-wall into two spaces connected together by a very narrow tube $h$. The gas flowing from the reduction-valve into the stowing-space is consequently stowed in the compartment before the partition and can flow off through the much narrower aperture of the tube $h$ only with a much lesser velocity. As the gas contained in the stowing-space will acquire by this reason approximately constant velocity and pressure independent from the constancy or variability of the pressure of the gas source, the amount of gas flowing off through tube $h$ will always be practically the same. Thus approximately constant quantities of gas will always be fed in the unit of time to the diaphragm through the stowing arrangement, which has the same effect as a valve, and thereby secures an economical consumption of gas and a constant percentage of dissolved gas.

Having described the invention, what we claim is—

1. A method of keeping alive aquatic organisms consisting of supplying to a body of liquid, through a permeable body, a solution containing a life-maintaining element.

2. A method of keeping alive aquatic organisms consisting of supplying to a body of liquid, through a permeable body, a solution containing a life-maintaining gas.

3. A method of keeping alive aquatic organisms consisting of supplying a solution containing a life-maintaining element to a body of water, through a permeable body, in such water.

4. A method of keeping alive aquatic organisms consisting in dissolving a life-maintaining gas in liquid contained in a hollow porous vessel or chamber.

5. A method of keeping alive aquatic organisms consisting in dissolving a life-maintaining gas, supplying the gas to a body of water in a stream of uniform velocity and pressure and in subsequently charging the solution into a body of water, through a permeable body in such water.

In testimony whereof we have hereunto set our hands in presence of two subscribing witnesses.

FERDINAND KALTENEGGER.
NORBERT LORENZ VON LIBURNAU.

Witnesses:
ARNOLD GRÓSZ,
ALVESTO S. HOGUE.